United States Patent [19]
Widlund

[11] 3,867,841
[45] Feb. 25, 1975

[54] ONE-PIECE SNAP ASSEMBLY PLASTIC MOVEMENT FOR GAUGES

[75] Inventor: Charles R. Widlund, Schwenksville, Pa.

[73] Assignee: Ametek, Inc., New York, N.Y.

[22] Filed: May 9, 1973

[21] Appl. No.: 358,706

[52] U.S. Cl. .................................. 73/432 A, 73/418
[51] Int. Cl. .......................... G01l 19/00, G01l 7/04
[58] Field of Search ............................ 73/411–418, 73/141 R, 118, 431, 432 A; 403/355; 308/DIG. 10, 189 R; 58/140 R

[56] References Cited
UNITED STATES PATENTS
2,483,635  10/1949  Grant.................................... 73/411
3,530,720   9/1970  Harland et al....................... 73/415

Primary Examiner—Donald O. Woodiel
Attorney, Agent, or Firm—Smythe & Moore

[57] ABSTRACT

A mounting base for the movement of a gauge such as a pressure or vacuum gauge, which comprises a plastic unitary bracket wherein a shaft bearing has a slotted wall through which a pinion shaft or other shaft of the movement can be inserted and retained. Side projections also can be mounted on both sides of the bracket, each side projection having an aperture and slot into which selectively can be inserted the arbor shaft or pinion shaft of the movement. The arbor shaft can be inserted into either side projection so that the indicator gauge can function as a pressure or vacuum gauge. The slot is narrower than the bearing aperture so that the shaft can be snapped or pushed therethrough into the bearing hole and retained therein.

8 Claims, 11 Drawing Figures

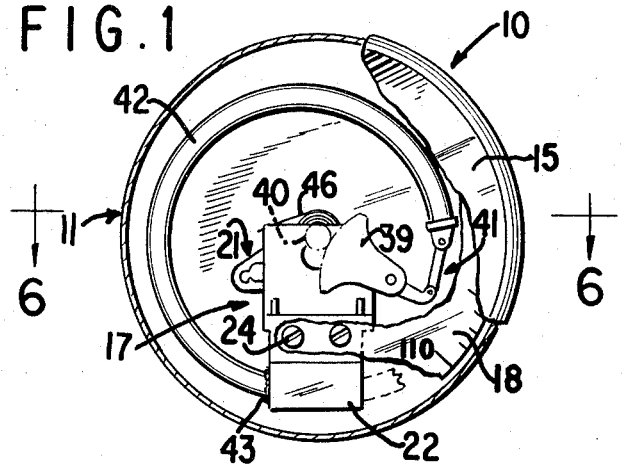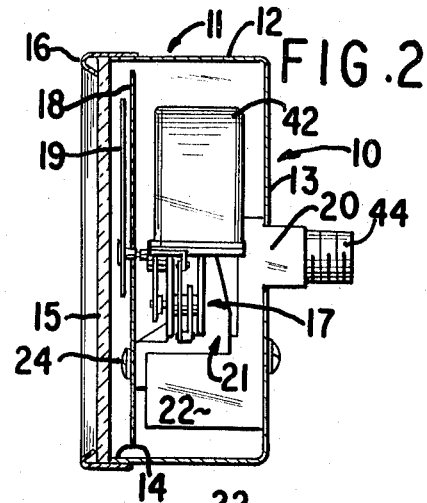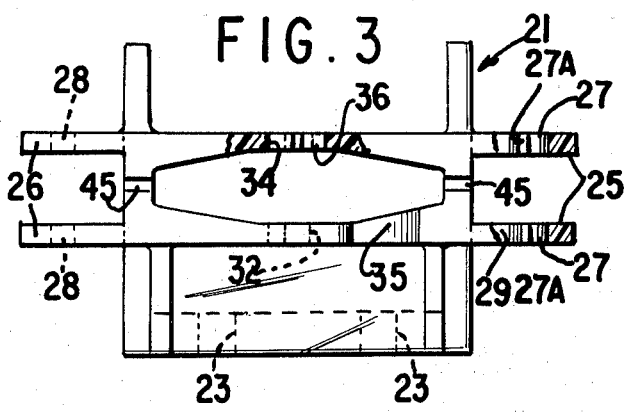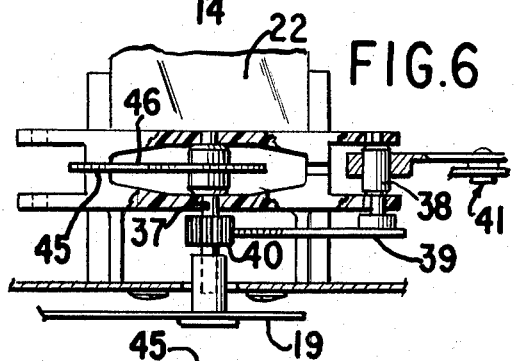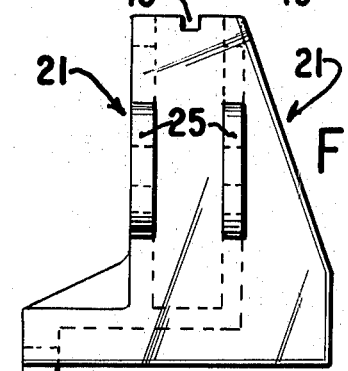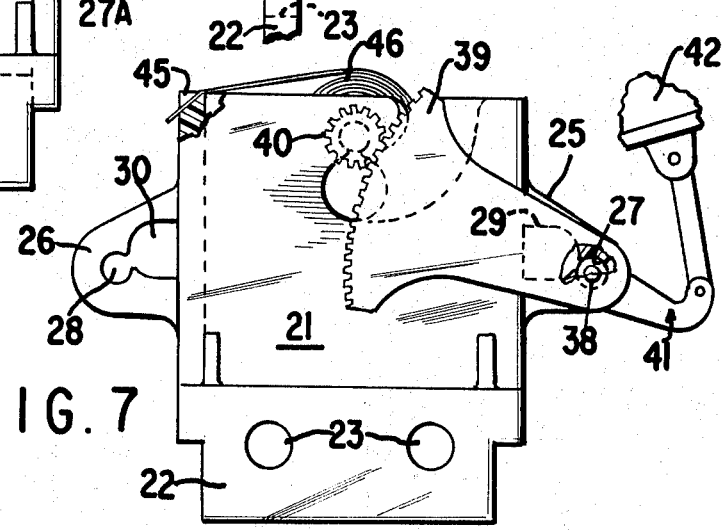

ONE-PIECE SNAP ASSEMBLY PLASTIC MOVEMENT FOR GAUGES

The present invention relates to gauges of the general type having a movement mounted within a casing and actuating a pointer movable over a dial face which is visible through a viewing window, and, more particularly, to the mounting of the movement within the gauge.

A gauge of the pressure or vacuum type generally comprises a substantially cylindrical casing having an open end within which is positioned a dial face having indicia thereon corresponding to the condition being sensed by the gauge. A movable pointer or hand moves over the dial face in response to the sensed condition. The sensed condition is transmitted to a movement mounted within the casing which actuates the pointer in response to the condition.

In a pressure or vacuum gauge of this general type, the condition may be sensed by a Bourdon tube which has one end connected to a socket which extends outwardly of the gauge to be connected to the line whose pressure or vacuum is to be measured. The other end of the tube is connected by a suitable linkage to a pivotable segment gear meshing with the pinion gear, the movement of the pinion being transmitted to the pointer. Since the movement of the Bourdon tube when measuring a pressure is opposite to that when measuring a vacuum, the same structure can be used for either a pressure or vacuum gauge, but it is necessary to reverse the mounting of the Bourdon tube. As a result, a new and different mounting bracket must be employed wherein the sector gear is mounted on its arbor on the opposite side of the bracket. Further, the mounting of the movement in a base generally involves the assembly of the various parts of the movement and the joining of the top and bottom plates by columns of the conventional movement. Such a construction involves numerous parts that must be assembled with consequent cost of manufacture.

One of the objects of the present invention is to provide an improved mounting base for the movement of a gauge or similar device.

Another of the objects of the present invention is to provide a mounting base for an indicator gauge which can be used for either a pressure or a vacuum gauge.

Still another of the objects of the present invention is to provide a gauge wherein the movement can be assembled in a very short period of time and with the minimum of effort.

According to one aspect of the present invention, a mounting base for the movement of an indicator gauge may comprise a unitary bracket formed from a suitable plastic. Bearing means having a restricted slot in the wall thereof are provided in the bracket into which the pinion and arbor shaft of a movement can be inserted and retained thereby. The bearing means with slotted walls may be formed on the opposing projections or portions positioned on either side of the bracket so that positioning of the arbor shaft in either side flange will enable the gauge to be used as a pressure or vacuum gauge.

The bearing means and slotted walls are in effect a keyhole-shaped configuration, the shaft means or journals being snappable or movable through the narrowed slot which will then snap back and retain the parts in assembled positioned. The mounting base and assembly can be used in other types of devices and controls.

Other objects, advantages and features of the present invention will be apparent from the accompanying description and drawings which are merely exemplary.

In the drawings:

FIG. 1 is a front elevational view of a gauge with portions of the viewing window and dial face cut away to show the movement assembly within the casing;

FIG. 2 is a side elevational view of the gauge in FIG. 1 with the casing sidewall being removed to show the interior of the gauge;

FIG. 3 is a top plan view of the mounting base for the movement of the gauge of FIGS. 1 and 2;

FIG. 4 is a front elevational view of the mounting base of FIG. 3;

FIG. 5 is a side elevational view of the bracket of FIG. 3 looking from the right;

FIG. 6 is a top plan view of the movement and bracket as seen along the line 6—6 of FIG. 1;

FIG. 7 is a fragmentary elevational view similar to FIG. 4 with the movement parts assembled therein;

Proceeding next to the drawings wherein like reference symbols indicate the same parts throughout the various views, a specific embodiment of the present invention will be described in detail.

Figure 8:
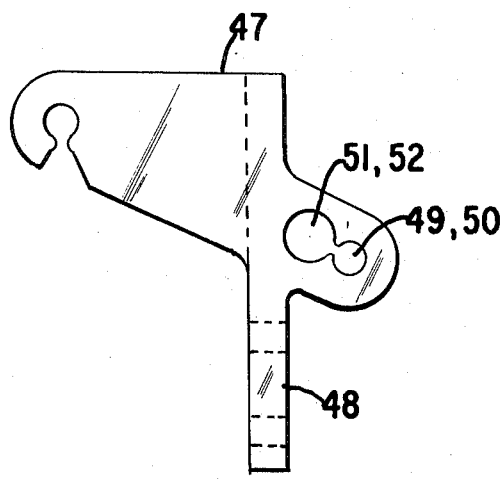
FIG. 8 is another form of bracket which can be used.

As may be seen in FIG. 1, there is indicated generally at 10 a gauge for measuring or indicating pressure or condition changes incorporating the present invention and comprising a substantially cylindrical casing 11 (FIG. 2) having a cylindrical side wall 12 and an end wall 13 which closes one end of the casing. The other end of the cylindrical casing indicated at 14 is open and is closed by a viewing window 15 retained in position by a closure cap 16. Other types of closures and casings may be used.

Within casing 11 is movement assembly 17 having a dial face 18 upon which is positioned a scale with indicia indicating the conditions or properties being sensed which may be above or below atmospheric or ambient conditions. A pointer 19 moves over the scale in response to the conditions sensed by the movement. The movement assembly 17 is mounted upon a socket 20 which extends through an opening in the closed end 13 of the casing and is sealed therein. The invention also can be used with a bottom connected socket (not shown).

Movement assembly 17 is mounted upon a unitary monolithic movement bracket or plate means 21 of the form shown in FIGS. 3–5 which can be molded or formed of a suitable synthetic plastic material, such as glass fiber reinforced nylon plastic. The mounting bracket 21 comprises a front mounting flange 22 in which are formed two openings 23 through which are passed screws 24 for securing the mounting bracket 21 onto the front of socket 20.

The mounting bracket or movement plate means comprises a pair of side flanges 25 and a second pair of side flanges 26 in which are formed bearing apertures 27 and 28 with slots 27A, 28A respectively, in the walls as shown in FIG. 4. Each bearing opens into enlarged or open portions 29, 30.

Adjacent the top edge of the bracket 21, there is also formed on each side a bearing aperture 32 with a slot 33 opening into an enlarged aperture 34 which is connected through opening 35 to the top of the bracket.

The bearing apertures and slots are arranged so that forces exerted by the parts held thereby are directed away from the slots in the bearing walls.

In the form shown in FIGS. 6 and 7, arbor 38 having a sector gear 39 is mounted to mesh with pinion 40 on shaft 37. The sector gear 39 is pivotally connected by suitable linkage 41 to an end of Bourdon tube 42 whose other end is fixed at 43 (FIG. 1) to a passage formed in the socket 20 and communicating through the connection 44 extending from the closed end of the casing.

A notch 45 in the side wall of the bracket 21 is formed to receive the end of a spiral hairspring 46 of the movement with the end of the spring being held in position by heat swaging the plastic over the hairspring or by any suitable means.

To assemble the movement, the pinion and hairspring assembly has one end placed into aperture 36 and the other end moved through the open end of slot 35 and pushed passed the narrow portion 33 into bearing 32. The narrow portion of the slot is so dimensioned that it retains the pinion in place under normal loading of the hairspring. In a similar manner, the segment and arbor assembly is installed in its proper location by inserting the arbor shaft 38 into the portion 29 and pushed passed the narrow portion into bearing 27. The free end of the hairspring is mounted in the notch 45 as described above.

The bracket 21 is so constructed that the pinion and segment and arbor assembly may be assembled as shown in FIGS. 6 and 7 or reversed so that the arbor is mounted in the bearing on the other side of the bracket. Thus, the bracket can be used for either pressure or vacuum gauges.

Figure 9:
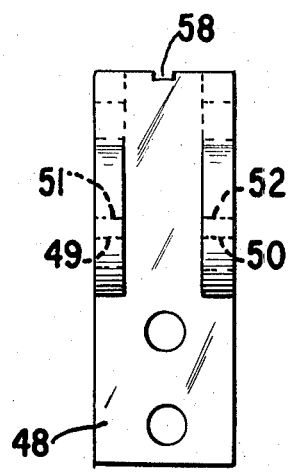
FIG. 9 is a side view of FIG. 8.

FIGS. 8 and 9 show a side mounted base 47 having an extension 48 which can be mounted as desired onto a socket. The bearings 49, 50 have restricted slots or passages 51, 52 through which the movement shaft means can be snapped in the manner described for the previous figures.

Figure 10:
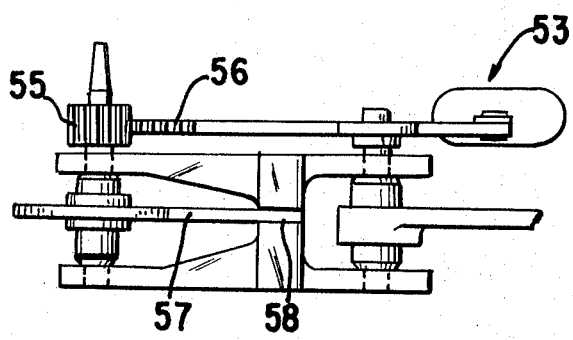
FIGS. 10 and 11 are top views of FIG. 8 showing the movement parts assembled thereto for pressure (FIG. 10) or vacuum (FIG. 11).
Figure 11:
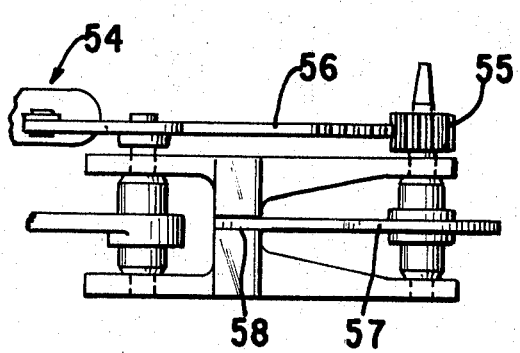

FIG. 10 illustrates the parts assembled for connection to a pressure operated Bourdon tube at 53 and FIG. 11 shows the parts reversed with the connection to the Bourdon tube at 54.

In the form shown in FIGS. 10 and 11, the pinion 55 and the sector 56 are on the outer side of the movement assembly. Hairspring 57 has its end held in groove 58 as described for the previous forms.

It will be understood that various details of construction can be varied without departing from the spirit of the invention except as defined in the appended claims.

What is claimed is:

1. In an indicator gauge or the like having a pinion, segment and arbor movement, the combination including a unitary plastic material movement bracket, shaft bearing means in said bracket for said movement, said bearing means including large and small pairs of apertures with a wall having slot means therein, movement shaft means mounted in the larger of said bearing means apertures, said slot means being dimensioned whereby said shaft means can be moved therethrough into the smaller of said bearing means apertures and will be retained therein, and condition responsive means connected to said shaft means.

2. In an indicator gauge or the like as claimed in claim 1 wherein there are at least two shaft means, one having a pinion thereon and connectable to an indicator, the other having a sector gear thereon meshing with said pinion, and means connecting said sector gear to said condition responsive means.

3. In an indicator gauge or the like as claimed in claim 2 wherein the slots and walls of the apertures are so positioned that tendency of the shaft means to separate during operation will urge the shafts against surfaces of the bearing means away from the slots so as to provide bearing support.

4. In an indicator gauge or the like as claimed in claim 2 wherein said pinion shaft has a hairspring thereon and said bracket has means for receiving one end of said hairspring.

5. In an indicator gauge or the like as claimed in claim 4 wherein said bracket has slot means for receiving and holding said end of said hairspring.

6. In an indicator gauge or the like as claimed in claim 1, said movement mounting base having a plurality of bearing means for selectively receiving said shaft means whereby the mounting base can selectively be used for vacuum and pressure condition responsive actuation.

7. In an indicator gauge or the like as claimed in claim 2 wherein the bearing means selectively interchangeably receive said shaft means for vacuum and pressure actuated condition responsive means.

8. In an indicator gauge or the like as claimed in claim 7 wherein there are at least one center bearing means and bearing means on each side thereof whereby the center bearing means and one of the bearing means on the side can be used to support the shaft means.

* * * * *